United States Patent [19] [11] 3,875,192
Suhr [45] Apr. 1, 1975

[54] N'-ALKOXY SULFANILAMIDES
[75] Inventor: Robert G. Suhr, Greenfield, Ind.
[73] Assignee: Eli Lilly and Company, Indianapolis, Ind.
[22] Filed: Nov. 13, 1972
[21] Appl. No.: 306,129

[52] U.S. Cl..... 260/397.7 R, 260/239.6, 260/239.7, 260/239.8, 71/88, 71/94, 71/95, 71/103
[51] Int. Cl. ........................................... C07c 143/80
[58] Field of Search .............260/397.7 R, 293.73, 260/326.5 SF, 239 E, 239 A, 260/239 BF, 239.6, 239.7, 239.8; 71/103

[56] References Cited
UNITED STATES PATENTS
3,367,949 2/1968 Soper ........................... 260/397.7 R
3,660,436 5/1972 Scherer et al. ................ 260/397.7 R
3,746,727 7/1973 Pilgram et al. ................ 260/397.7 R
3,828,079 8/1974 Mrozik ......................... 260/397.7 R Primary Examiner—Henry R. Jiles
Assistant Examiner—S. D. Winters
Attorney, Agent, or Firm—Joseph G. Jones; Leroy Whitaker

[57] ABSTRACT

A group of novel $N^4$-substituted-$N^1$-alkoxy(alkylthio)-3,5-dinitrosulfanilamides are herbicides which are particularly useful for preemergence control of weeds in ornamental turf.

4 Claims, No Drawings

N'-ALKOXY SULFANILAMIDES

BACKGROUND OF THE INVENTION

Organic chemical herbicides have been under study and in agricultural use since the invention of 2,4-D a generation ago. Increasingly sophisticated chemical and biological research has discovered many useful classes of organic chemical herbicides. The extremely rapid growth of knowledge in the field has led to the production of herbicidal compounds which are capable of highly selective control of undesirable plants in ornamental and crop plantings.

The benzenesulfonamides have been considered as selective herbicides. For example, Soper, U.S. Pat. No. 3,367,949, and Kaplan, U.S. Pat. No. 3,555,055, made discoveries in the field of sulfanilamide herbicides. Soloway, U.S. Pat. No. 3,227,734, disclosed related herbicidal methylsulfonylanilines. The compounds of those investigators, however, were too phytotoxic for use in some ornamental and crop species.

The dinitroaniline compounds disclosed by the following inventors, while quite distinct from the compounds of the present invention, are exemplary of herbicides derived from the dinitrobenzene nucleus.

Soper, U.S. Pat. No. 3,403,180
Soper, U.S. Pat. No. 3,111,403
Soper, U.S. Pat. No. 3,257,190
Maravetz, U.S. Pat. No. 3,686,230
Maravetz, U.S. Pat. No. 3,672,864
Hunter et al., U.S. Pat. No. 3,617,251

SUMMARY

New $N^4$-substituted-$N^1$-alkoxy(alkylthio)-3,5-dinitrosulfanilamides are disclosed. My new sulfanilamides are effective preemergence herbicides which inhibit the growth of seedling weeds and prevent the germination of weed seeds in established ornamental turf, with safety to the turf. I also disclose herbicidal compositions containing my new sulfanilamides which are useful in practicing my method of controlling weeds in turf.

DESCRIPTION OF THE PREFERRED EMBODIMENT

I have invented novel $N^1$-alkoxy(alkylthio)sulfanilamides of the formula

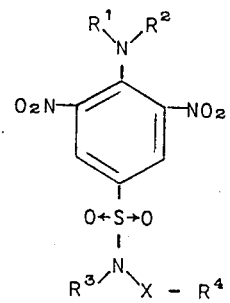

wherein
$R^1$ represents
- A. $C_1$–$C_6$ alkyl, optionally monosubstituted with
  1. methoxy,
  2. cyano,
  3. bromo, or
  4. chloro,
- B. $C_3$–$C_4$ alkenyl,
- C. $C_3$–$C_4$ alkynyl, or
- D. cyclopropylmethyl;

$R^2$ represents
- A. $C_1$–$C_6$ alkyl, optionally monosubstituted with
  1. methoxy,
  2. cyano,
  3. bromo, or
  4. chloro,
- B. $C_3$–$C_4$ alkenyl,
- C. $C_3$–$C_4$ alkynyl,
- D. cyclopropylmethyl, or
- E. hydrogen;

provided that $R^1$ and $R^2$ together contain no more than 8 carbon atoms;
or
$R^1$ and $R^2$ together with the nitrogen atom to which they are attached form
- A. piperidino,
- B. pyrrolidino,
- C. morpholino,
- D. aziridino,
- E. azetidino, or
- F. hexahydroazepino;

$R^3$ represents
- A. hydrogen, or
- B. methyl;

X represents
- A. oxygen, or
- B. sulfur;

$R^4$ represents $C_1$–$C_6$ alkyl, optionally substituted with halo; provided that $R^2$ represents hydrogen only when X represents oxygen.

In the above generic formula, the general chemical terms are used in the sense in which they are normally understood in the organic chemical art.

The terms $C_1$–$C_6$ alkyl, $C_3$–$C_4$ alkenyl, and $C_3$–$C_4$ alkynyl refer to groups such as methyl, hexyl, isopropyl, n-pentyl, t-butyl, allyl, methallyl, crotyl, propargyl, 2-butynyl, s-butyl, and ethyl.

The term halo refers to fluoro, chloro, bromo, and iodo.

The following compounds, which are exemplary but by no means exhaustive of my novel sulfanilamides, are named in order to make the scope of my invention more clear.

$N^4$-cyclopropylmethyl-$N^1$-methoxy-3,5-dinitro-$N^4$-propylsulfanilamide $N^4$-ethyl-$N^1$-isopropoxy-3,5-dinitro-$N^4$-propargylsulfanilamide $N^1$-butoxy-$N^4$-butyl-$N^4$-crotyl-$N^1$-methyl-3,5-dinitrosulfanilamide $N^4$-(3-butynyl)-$N^4$-s-butyl-3,5-dinitro-$N^1$-methoxysulfanilamide $N^1$-ethoxy-$N^4$-methallyl-$N^1$,$N^4$-dimethyl-3,5-dinitrosulfanilamide $N^4$-allyl-3,5-dinitro-$N^1$-(2-iodopropylthio)-$N^4$-propylsulfanilamide 3,5-dinitro-$N^4$,$N^4$-dipropyl-$N^1$-(1,1,2,2-tetrafluoroethoxy)-sulfanilamide $N^4$-t-butyl-$N^1$-hexyloxy-$N^1$-methyl-3,5-dinitrosulfanilamide $N^4$-ethyl-3,5-dinitro-$N^4$-pentyl-$N^1$-(3,3,3-trichloropropylthio)sulfanilamide $N^1$-methyl-$N^1$-methylthio-$N^4$,$N^4$-di(2-methoxyethyl)-3,5-dinitrosulfanilamide $N^4$-(3-cyanopropyl)-$N^4$-(2-chloroethyl)-3,5-dinitro-$N^1$-pentylthiosulfanilamide N-(3-bromobutoxy)-4-morpholino-3,5-dinitrobenzenesulfonamide 4-aziridino-N-(3-hexyloxy)-N-methyl-3,5-dinitrobenzenesulfonamide 4-azetidino-N-ethylthio-3,5-dinitrobenzenesulfonamide N-(2-fluoroethylthio)-4-hexahydroazepino-N-methyl-3,5-dinitrobenzenesulfonamide $N^4$-(2-bromoethyl-$N^4$-(2-bromopropyl)-$N^1$-s-butylthio-$N^1$-methyl-3,5-dinitrosulfanilamide $N^4$-(2-chloroethyl)-$N^4$-cyclopropylmethyl-$N^1$-iodomethylthio-3,5-dinitrosulfanilamide $N^1$-(3-chloropropylthio)-$N^4$-isopropyl-$N^1$-methyl-3,5-dinitro-$N^4$-propargylsulfanilamide $N^1$-(2-fluorobutoxy)-$N^4$-(2-chloroethyl)-$N^4$-crotyl-3,5-dinitrosulfanilamide $N^4$-allyl-$N^1$-bromomethoxy-$N^1$,$N^4$-dimethyl-3,5-dinitrosulfanilamide 3,5-dinitro-N-pentoxy-4-piperidinobenzenesulfonamide N-(3-bromopropylthio)-N-methyl-3,5-dinitro-4-pyrrolidinobenzenesulfonamide The following compounds are the preferred species of my invention.

$N^1$-methoxy-3,5-dinitro-$N^4$,$N^4$-dipropylsulfanilamide $N^1$-ethoxy-3,5-dinitro-$N^4$,$N^4$-dipropylsulfanilamide $N^1$-butoxy-3,5-dinitro-$N^4$,$N^4$-dipropylsulfanilamide $N^4$-butyl-$N^4$-ethyl-$N^1$-methoxy-3,5-dinitrosulfanilamide $N^4$-ethyl-$N^1$-methoxy-3,5-dinitro-$N^4$-propylsulfanilamide I have also discovered a method of inhibiting the growth of seedling weeds and preventing the germination of weed seeds in established ornamental turf which comprises applying one of the compounds described above to the turf. Further, I have discovered herbicidal compositions which comprise a suitable inert carrier and a compound of the formula shown above. The most effective methods of applying my compounds to ornamental turf, and the most effective formulations of herbicidal compositions, will be discussed below.

All of my novel $N^1$-alkoxy(alkylthio)sulfanilamides are made from 4-(substituted amino)-3,5-dinitrobenzenesulfonyl chlorides. The 4-amino group may be either mono- or disubstituted when an $N^1$-alkoxy product is to be made; it is disubstituted when the desired product is an $N^1$-alkylthio compound. Such compounds are well known in the organic chemical art, and are readily obtainable or easily synthesized by the chlorination of a salt of the corresponding sulfonic acid with $PCl_5$ in dichloroethane. All of the other reactants used in the synthesis of my compounds are also known to the organic chemical art. A skilled chemist can synthesize my novel sulfanilamides from his knowledge of the art; the following general methods of synthesis and preparative examples are offered only to assure that all may obtain my novel compounds.

My $N^1$-alkoxysulfanilamides are produced by reacting the starting benzenesulfonyl chloride at ambient or moderately elevated temperature with an appropriately-substituted hydroxylamine. For example, an $N^1$-methoxy-$N^1$-methyl compound is produced from N-methoxy-N-methylamine as a reactant. An $N^1$-butoxy compound is produced from butoxyamine. It is often convenient to use the hydroxylamine in the form of a salt, especially the hydrochloride.

The amination reaction is carried out in an inert reaction solvent at ambient or moderately elevated temperature in the presence of an acid scavenger, which is needed as a receptor for the HCl released by the reaction. Pyridine is a convenient reaction solvent which also serves as the acid scavenger. Lower alcohols, such as ethanol, are also excellent reaction solvents for the amination. Tertiary organic bases, such as triethylamine and triethanolamine, and inorganic bases, such as sodium carbonate and potassium hydroxide, are useful acid scavengers. Excess of the hydroxylamine itself may be used as the acid scavenger if the hydroxylamine is used as the free base rather than as a salt.

My $N^1$-alkylthiosulfanilamides are made in two steps. In the first step, the chlorine atom of the starting benzenesulfonyl chloride is replaced with an amino or a methylamino group by reaction with ammonia or methylamine. Methylamine may be used either in the gaseous phase or as the hydrochloride or other salt. In the second step of the synthesis, a properly substituted sulfenyl chloride, of the general formula $R^4SCl$, is reacted with the sulfanilamide formed in the first step. Both steps of the synthesis of my alkylthiosulfanilamides are HCl-releasing reactions, and are conveniently carried out in the same manner as is the amination described above for the synthesis of my alkoxysulfanilamides.

The following preparative example illustrates a typical synthesis of my $N^1$-alkoxy compounds.

EXAMPLE 1

$N^4$-(1-ethylpropyl)-$N^1$-methoxy-3,5-dinitrosulfanilamide

Four g. of 4-(1-ethylpropylamino)-3,5-dinitrobenzenesulfonyl chloride was dissolved in 50 ml. of pyridine and 1 g. of methoxyamine hydrochloride was added. The mixture was warmed to 60°C. and held at that temperature for 2 hours. The reaction mixture was then poured into ice water, and the product was collected by filtration and washed on the filter with water. The product was then dried under vacuum and recrystallized from methanol. The yield was 1.5 g. of $N^4$-(1-ethylpropyl)-$N^1$-methoxy-3,5-dinitrosulfanilamide, m.p. 88°–90°C., which was identified by NMR analysis. The elemental analysis was as follows.

|   | Calculated | Found |
|---|---|---|
| C | 39.78% | 39.51% |
| H | 5.07% | 5.12% |
| N | 15.46% | 15.34% |

Example 2 below illustrates the first step of the synthesis of my $N^1$-alkylthiosulfanilamides.

EXAMPLE 2

$N^1$-methyl-3,5-dinitro-$N^4$,$N^4$-dipropylsulfanilamide

A 5 g. portion of 3,5-dinitro-4-dipropylaminobenzenesulfonyl chloride was reacted with 3.5 g. of methylamine hydrochloride in a solution of 150 ml. of benzene and 5 g. of triethylamine at reflux temperature with stirring for 3 hours. The reaction mixture was then cooled, mixed with 200 ml. of ethyl ether, and filtered. The filtrate was evaporated to dryness under vacuum, the residue was dissolved in acetone, and the product was crystallized by the addition of petroleum ether to the acetone solution. The product was identified as N$^1$-methyl-3,5-dinitro-N$^4$,N$^4$-dipropylsulfanilamide, m.p. 145°–146°C., by NMR analysis.

The second step of the synthesis of my N$^1$-alkylthiosulfanilamides is illustrated by Example 3 below.

EXAMPLE 3

N$^1$-methyl-3,5-dinitro-N$^4$,N$^4$-dipropyl-N$^1$-trichloromethylthiosulfanilamide A 3.6 g. portion of N$^1$-methyl-3,5-dinitro-N$^4$,N$^4$-dipropylsulfanilamide, made as in Example 2 above, was mixed with 2.8 g. of trichloromethylsulfenyl chloride in 60 ml. of pyridine. The solution was stirred at room temperature for 2 hours. Some tar formed. The solution was decanted, mixed with 100 ml. of benzene, and evaporated to dryness under vacuum. The residue was dissolved in acetone and 10 g. of activated carbon was added with stirring. The suspension was filtered, and the filtrate was evaporated to dryness under vacuum. The residue was crystallized from acetonitrile-ethanol, to yield 1.8 g. of N$^1$-methyl-3,5-dinitro-N$^4$,N$^4$-dipropyl-N$^1$-trichloromethylthiosulfanilamide, m.p. 144°–146°C.

The following exemplary compounds are made by the processes of Examples 1 through 3 with small modifications which can readily be supplied by one skilled in the art.

N-methoxy-3,5-dinitro-4-piperidinobenzenesulfonamide, m.p. 110°–112°C.

N$^4$-butyl-N$^4$-ethyl-N$^1$-methoxy-3,5-dinitrosulfanilamide, m.p. 63°–66°C.

N$^4$-ethyl-N$^1$-methoxy-3,5-dinitro-N$^4$-propylsulfanilamide, m.p. 83°–86°C.

N$^4$,N$^4$-diallyl-N$^1$-methoxy-3,5-dinitrosulfanilamide, m.p. 69°–71°C.

N$^1$-methoxy-N$^1$-methyl-3,5-dinitro-N$^4$,N$^4$-dipropylsulfanilamide, m.p. 115°–118°C.

N$^1$-ethoxy-3,5-dinitro-N$^4$,N$^4$-dipropylsulfanilamide, m.p. 50°–53°C.

N$^4$-(2-chloroethyl)-N$^1$-methoxy-3,5-dinitro-N$^4$-propylsulfanilamide, m.p. 110°–113°C.

N$^4$,N$^4$-diethyl-N$^1$-methoxy-3,5-dinitrosulfanilamide, m.p. 113°–115°C.

N$^1$-butoxy-3,5-dinitro-N$^4$,N$^4$-dipropylsulfanilamide, m.p. 131°–133°C.

N$^1$-methoxy-3,5-dinitro-N$^4$,N$^4$-dipropylsulfanilamide, m.p. 111°–112°C.

I have proved the herbicidal efficacy of my new compounds by testing by means of the following test method. Six parts by weight of the compound to be tested was dissolved in 94 weight parts of 1:1 acetone:ethanol containing 1.25 percent each of two proprietary surfactants trademarked Toximul R and Toximul S produced and sold by Stepan Chemical Company of Northfield, Ill. The surfactants are blends of sulfonates and nonionics made for agricultural chemical use. One part by volume of the solution was then dispersed in nine parts by volume of water.

Seeds of the plants to be used as indicators of herbicidal activity were planted in perforated galvanized steel pans. The soil used was a mixture of sand and shredded topsoil in equal volumes. When a preemergence herbicidal test was to be performed, the compound to be tested was sprayed on the soil the same day that the seeds were planted. When a postemergence herbicidal test was to be performed, the dispersion was sprayed evenly with an atomizer over the plants growing in the pan from 10 to 13 days after the seeds were planted. The amount of dispersion applied to each pan was calculated to apply the desired rate of compound, measured in pounds per acre. All pans were held in a greenhouse at 74°–80°F. and received from 12 to 18 hours of light per day.

The treated plants were evaluated 12 to 13 days after treatment. Herbicidal effects were rated on the scale shown below.

0 — no injury, plants are identical to untreated control plants
1 — slight injury
2 — moderate injury
3 — severe injury
4 — death The results of herbicidal tests of representative compounds of my invention are shown below.

EXAMPLE 4

N$^1$-methyl-3,5-dinitro-N$^4$,N$^4$-dipropyl-N$^1$-trichloromethylthiosulfanilamide

|  | 8 lbs./A. Preemergence | 8 lbs./A. Postemergence |
|---|---|---|
| crabgrass | 3 | 2 |
| pigweed | 0 | 1 |
| foxtail | 1 | 1 |

EXAMPLE 5

N$^1$-methoxy-N$^1$-methyl-3,5-dinitro-N$^4$,N$^4$-dipropylsulfanilamide

|  | 8 lbs./A. Preemergence | 8 lbs./A. Postemergence |
|---|---|---|
| crabgrass | 2 | 2 |
| pigweed | 1 | 3 |
| foxtail | 2 | 0 |

EXAMPLE 6

N$^1$-ethoxy-3,5-dinitro-N$^4$,N$^4$-dipropylsulfanilamide

|  | 2 lbs./A. Preemergence | 8 lbs./A. Preemergence | 8 lbs./A. Postemergence |
|---|---|---|---|
| crabgrass | 4 | 4 | 3 |
| mustard | 2 | — | — |
| pigweed | 4 | — | 2 |
| foxtail | 3 | 4 | 2 |

EXAMPLE 7

N$^4$-(2-chloroethyl)-N$^1$-methoxy-3,5-dinitro-N$^4$-propylsulfanilamide

|  | 8 lbs./A. Preemergence | 8 lbs./A. Postemergence |
|---|---|---|
| crabgrass | 3 | 0 |
| pigweed | 2 | 1 |
| foxtail | 2 | 0 |
| velvetleaf | 2 | 0 |

EXAMPLE 8

$N^1$-butoxy-3,5-dinitro-$N^4,N^4$-dipropylsulfanilamide

|  | 2 lbs./A. Preemergence | 8 lbs./A. Preemergence | 8 lbs./A. Postemergence |
|---|---|---|---|
| crabgrass | 4 | 4 | 2 |
| pigweed | 2 | — | 1 |
| foxtail | 2 | 3 | 2 |

EXAMPLE 9

$N^1$-methoxy-3,5-dinitro-$N^4,N^4$-dipropylsulfanilamide

|  | ½ lb./A. Preemergence | 2 lbs./A. Preemergence |
|---|---|---|
| crabgrass | 3 | 4 |
| foxtail | 2 | 3 |

EXAMPLE 10

$N^4$-butyl-$N^4$-ethyl-$N^1$-methoxy-3,5-dinitrosulfanilamide

|  | 1 lb./A. Preemergence | 4 lbs./A. Preemergence |
|---|---|---|
| barnyard grass | 2 | 2 |
| cocklebur | 0 | 3 |
| crabgrass | 2 | 3 |
| pigweed | — | 3 |

EXAMPLE 11

$N^4$-ethyl-$N^1$-methoxy-3,5-dinitro-$N^4$-propylsulfanilamide

|  | 1 lb./A. Preemergence | 4 lbs./A. Preemergence |
|---|---|---|
| barnyard grass | 2 | 3 |
| lambsquarters | 1 | 3 |
| crabgrass | 1 | 3 |
| pigweed | 0 | 3 |

EXAMPLE 12

$N^4,N^4$-diallyl-$N^1$-methoxy-3,5-dinitrosulfanilamide

|  | 1 lb./A. Preemergence | 4 lbs./A. Preemergence |
|---|---|---|
| barnyard grass | 0 | 3 |
| crabgrass | 1 | 3 |
| foxtail | 0 | 2 |
| pigweed | 0 | 2 |

The data presented in the above examples illustrate the outstanding herbicidal efficacy of my compounds. It is clear from the data that the new compounds control a large number of weeds, including those which most seriously infest turf.

EXAMPLE 13

The following test was conducted to prove the safety to turf, and the herbicidal effectiveness in turf, of a representative compound, $N^1$-methoxy-3,5-dinitro-$N^4,N^4$-dipropylsulfanilamide, of my invention. The turf, which was well established when the test was begun, consisted of a mixture of Kentucky bluegrass and creeping red fescue. The compound was applied in mid-spring in the form of a 25 percent wettable powder which was dispersed in water in concentrations which provided a spray volume of 227 gallons per acre in all applications. A tractor-mounted sprayer was used to apply the water-dispersed wettable powder to the turf at application rates of 1, 1½, 2, and 4 lbs. of herbicide per acre. Approximately 10 weeks after application of the herbicide, the population of large crabgrass, the most serious weed infesting turf in the area, was assessed by an expert plant physiologist and compared to the infestation in control plots. Crabgrass was controlled by the herbicide applications as follows.

| Lbs./Acre | % Control |
|---|---|
| 1 | 73.3 |
| 1½ | 93.3 |
| 2 | 91.7 |
| 4 | 98.0 |

Approximately 10 weeks and 20 weeks after application of the herbicide, injury caused by the herbicide to the turf grass was evaluated. The observed injury consisted of thinning out of the fescue component of the turf. Visual estimates of the extent of thinning, in percent, were made by an expert plant physiologist.

| Lbs./Acre | 10-Week Thinning | 20-Week Thinning |
|---|---|---|
| 1 | 0 | 0 |
| 1½ | 1.7% | 0 |
| 2 | 6.7% | 0 |
| 4 | 20% | 0 |

The data of Example 13 illustrate that my sulfanilamides are not only effective in the control of turf weeds, but are also essentially harmless to ornamental turf.

The herbicidal efficacy data presented above show that my sulfanilamides both inhibit the growth of seedling weeds, and prevent the germination of weed seeds which have not yet germinated when a compound is applied. Therefore, my compounds control weed species growing in turf whether the compounds are applied before or soon after the germination of the weed seeds. As is usual in turf culture, the best herbicide performance is obtained when my compounds are applied in the spring, before weed seeds have germinated, but after the turf has broken dormancy and has begun to grow again.

As Example 13 illustrates, my compounds are safe for use in established ornamental turf. In a northern climate, it usually takes a full year for new turf to establish itself, depending on rainfall, temperature, and soil fertility. In southern climates, turf usually establishes itself in 6 months.

My sulfanilamides are useful herbicides for use in the culture of all of the common ornamental turf grasses. Application of my compounds is beneficial to both the northern cool-season grasses, such as the several varieties of bluegrass, bent grass, ryegrass, and the fescues, and the warm-season grasses such as Bermuda, St. Augustine, zoysia, and bahia grasses.

A wide range of weeds, both grassy and broadleafed, are controlled by my new compounds. The most troublesome turf weeds are the grass weeds, such as barnyard grass, the foxtails, and especially the crabgrasses. My compounds are very effective in inhibiting the growth of seedlings of the above grasses, and in preventing the germination of their seeds. The new sulfanilamides are also effective in the control of broadleafed weeds, such as the panicums, purslane, carpet weed, lambsquarters, pigweed, and morningglory.

The extent of the weed control obtained depends on the species of the weed to be controlled and the identity and the amount of the compound applied to the turf which the weed is infesting. In some instances, the whole population of the weed is killed. In other instances, part of the weeds are killed, and part are injured. The mere injury of a weed plant growing in turf is quite beneficial to the turf. When the weed is injured, while the turf continues to grow normally, the turf usually crowds out the weed.

It is necessary to apply to the turf at least an effective herbicidal amount of a compound of my invention. Effective amounts of herbicides are usually measured in pounds of compound applied per acre of turf. The determination of the herbicidal amount for each weed is accomplished by merely applying different amounts to test plots as was done in the tests reported above. In general, effective herbicidal amounts of my compounds lie in the range between about one-half and about 20 pounds per acre. A preferred range of rates of my compounds is from about 1 to about 8 pounds per acre.

It is possible to apply my sulfanilamides to turf in the pure form. It is much convenient to apply one of my herbicidal compositions containing my compounds. My herbicidal compositions are novel because of the presence of my new compounds therein. The inert carriers which comprise the compositions and the methods of manufacture of the compositions are those which are conventional in the agricultural chemicals art. In order to make the best methods of use of my compounds clear, some explanation of the formulation of my herbicidal compositions will be given.

Herbicidal compositions comprise one or more of my sulfanilamides and at least one inert carrier. Inert carriers may be chosen from liquids and solids.

Often, my compounds are formulated as concentrated compositions which are applied in the form of water dispersions or emulsions containing from about 0.1 percent to about 1 percent of the compound. Water-dispersible or emulsifiable compositions are either solids usually known as wettable powders, or liquids usually known as emulsifiable concentrates.

Herbicidal wettable powders comprise an intimate mixture of the active compound, an inert carrier, and surfactants. The concentration of the active compound is usually from about 10 percent to about 90 percent. The inert carrier is usually chosen from among the attapulgite clays, the montmorillonite clays, the diatomaceous earths, or the purified silicates. Effective surfactants, comprising from about 0.5 percent to about 10 percent of the wettable powder, are found among the sulfonated lignins, the condensed naphthalenesulfonates, the naphthalenesulfonates, the alkylbenzenesulfonates, the alkyl sulfates and nonionic surfactants such as ethylene oxide adducts of phenol.

Typical herbicidal emulsifiable concentrates of my compounds comprise a convenient concentration of the active compound, such as from about one-half to about 4 lbs./gal. of liquid, dissolved in an inert carrier which is a mixture of water-immiscible organic solvent and emulsifiers. The organic solvent is chosen with regard to its solvency and its cost. Useful organic solvents include the aromatics, especially the xylenes, and the petroleum fractions, especially the high-boiling naphthalenic and olefinic portions of petroleum such as heavy aromatic naphtha. Other organic solvents may also be used, such as the terpenic solvents including rosin derivatives. Suitable emulsifiers for emulsifiable concentrates are chosen from the same types of surfactants used for wettable powders.

Solid, granular compositions are most convenient for the application of my compounds. Herbicidal granules typically comprise the herbicide dispersed on a granular inert carrier such as coarsely ground clay. Granular fertilizer is also a particularly convenient inert carrier for herbicides to be applied to turf. The particle size of herbicidal granules usually ranges from about 0.1 to about 3 mm. The usual formulation process comprises dissolving the sulfanilamide in an inexpensive solvent, such as kerosene or heavy aromatic naphtha, and applying the solution to the carrier in an appropriate solids mixer. Less economically, my sulfanilamides may be dispersed in a dough composed of damp clay or other inert carrier. The dough is then dried and coarsely ground to produce the desired granular product.

A particularly satisfactory method of forming granules of my sulfanilamides is known as spheronizing and is accomplished in specific equipment which was disclosed in U.S. Pat. No. 3,579,719. The process comprises the dispersion of the active compound in a damp dough of an appropriate inert carrier, particularly clay such as attapulgite clay, kaolin, or diatomaceous earth, the extrusion of the dough through a die containing small holes in the range of from about 0.2 mm. to about 3 mm., and the rolling of the extrudate on a horizontal rotating plate. The plate rotates at the bottom of a vertical cylinder and is usually scored or roughened in order to increase the friction between the rotating plate and the extrudate. The rolling action of the particles of extrudate breaks the long particles into sections approximately as long as the extrudate is thick, rolls the broken particles against one another, and forms the particles into rounded ellipsoidal or approximately spherical granules which are superior in uniformity of particle size, in freedom from dust, and in flow characteristics.

My herbicidal compositions may be applied to turf by the use of conventional turf care equipment. For example, water-dispersed compositions are applied by means of sprayers which may be hand-carried, tractor-mounted, self-propelled or towed. Granular compositions are applied by any of the many metering applicators which are in lawn use. The operator of the application equipment need only take care to apply an amount of the composition per acre which supplies the desired application rate of the sulfanilamide, and to apply it evenly throughout the turf area.

Mixtures of pesticides, such as two or more herbicides or an herbicide and an insecticide, are conveniently used to allow treatment of an area for control of several turf pests by one application. The use of my sulfanilamides in such mixtures is feasible and is within the scope of my invention.

I claim:

1. A compound of the formula

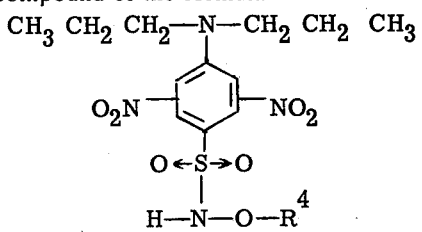

wherein $R^4$ represents methyl, ethyl or $n$-butyl.

2. The compound of claim 1 which is $N^1$-methoxy-3,5-dinitro-$N^4,N^4$-di-n-propylsulfanilamide.

3. The compound of claim 1 which is $N^1$-ethoxy-3,5-dinitro-$N^4,N^4$-di-n-propylsulfanilamide.

4. The compound of claim 1 which is $N^1$-n-butoxy-3,5-dinitro-$N^4,N^4$-di-n-propylsulfanilamide.

* * * * *

UNITED STATES PATENT OFFICE
CERTIFICATE OF CORRECTION

PATENT NO. : 3,875,192
DATED : April 1, 1975
INVENTOR(S) : Robert G. Suhr

It is certified that error appears in the above-identified patent and that said Letters Patent are hereby corrected as shown below:

The title "N'-ALKOXY SULFANILAMIDES" should be corrected to read---$N^1$-ALKOXYSULFANILAMIDES---.

Column 11, lines 5 through 15, the diagram should be corrected to read---

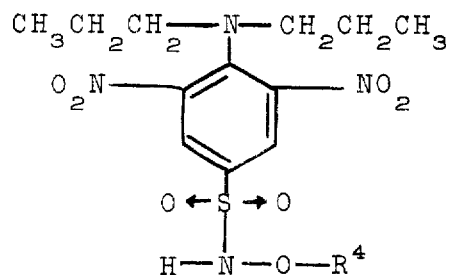

Signed and sealed this 15th day of July 1975.

(SEAL)
Attest:

RUTH C. MASON
  Attesting Officer

C. MARSHALL DANN
Commissioner of Patents
  and Trademarks